March 19, 1968 P. HUSKA 3,373,955
PITCH AND YAW ACTUATOR ASSEMBLY FOR VEHICLE GUIDANCE SURFACES
Filed May 25, 1964
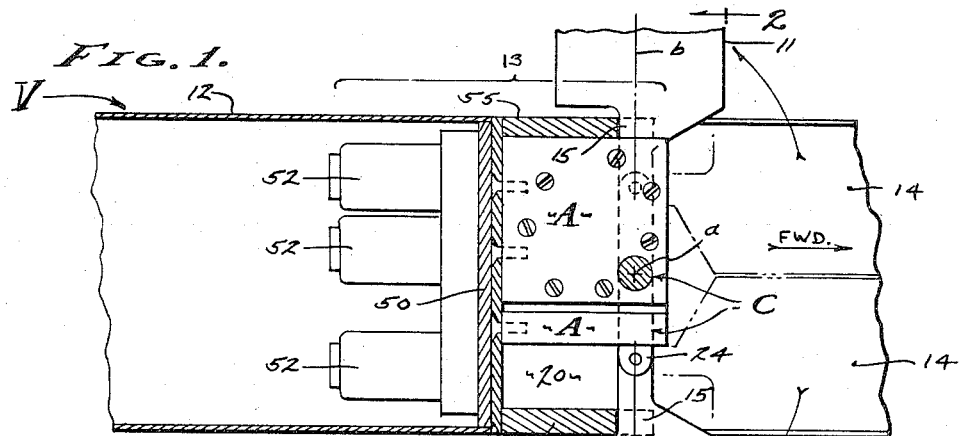
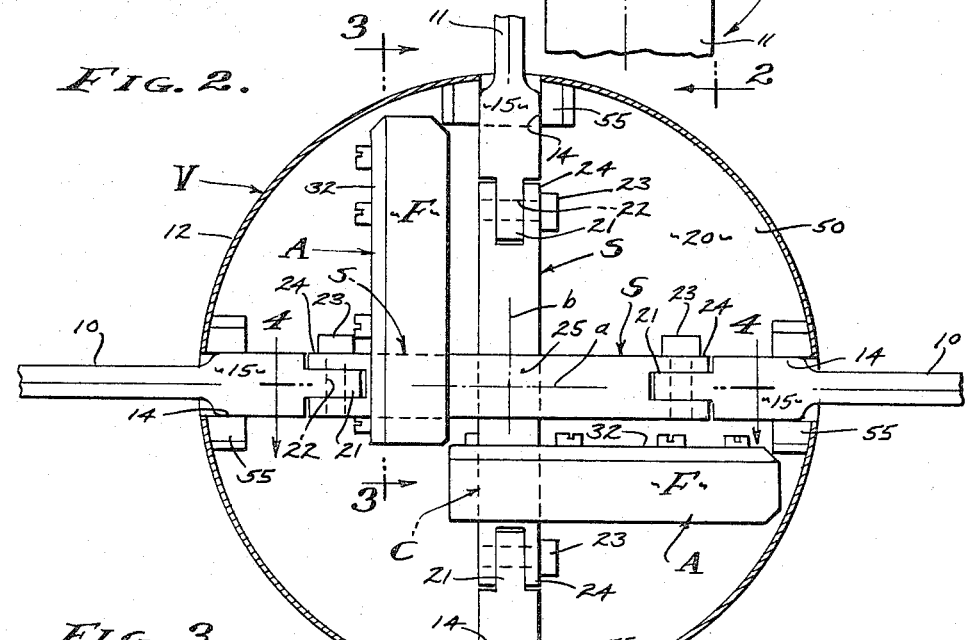
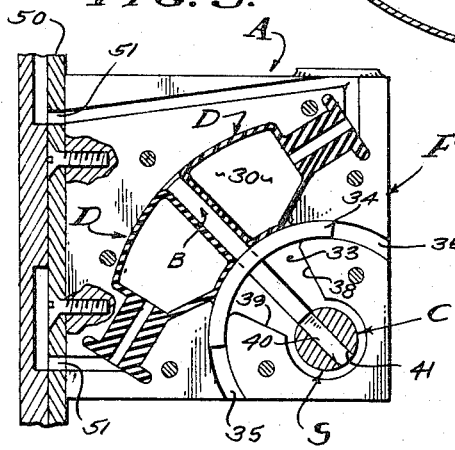
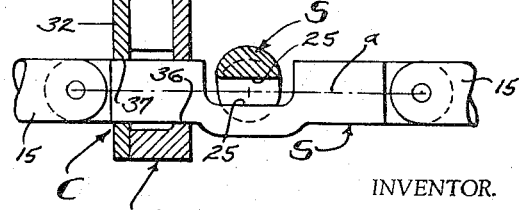
INVENTOR.
PAUL HUSKA
BY
AGENT

United States Patent Office 3,373,955
Patented Mar. 19, 1968

3,373,955
PITCH AND YAW ACTUATOR ASSEMBLY FOR
VEHICLE GUIDANCE SURFACES
Paul Huska, 739 Moreno, Los Angeles, Calif. 90049
Filed May 25, 1964, Ser. No. 369,903
6 Claims. (Cl. 244—3.21)

This invention relates to actuators for vehicle guidance surfaces and is particularly concerned with the independent revolvement of pitch and yaw control surfaces that are normally disposed on intersecting axes related 90° relative to each other, it being general object of this invention to provide a compact and effective relationship of actuators adapted to independently revolve angularly related control surfaces disposed on closely related or crossed areas.

Vehicles of the type which travel through the atmosphere, or the like, are usually provided with control surfaces that react with said atmosphere to alter the heading of the vehicle. This occurs when the vehicle is in motion (forward motion) and requires normally, at least, two control axes. That is, both the pitch and yaw of the vehicle must be controlled in order to have complete control over the heading thereof. The mode of propulsion, the method of guidance and the purpose of the vehicle can vary widely, it being a requirement that frontal area or cross section of the vehicle to reduced to a minimum.

A vehicle of the character above referred to is usually round in cross section and has a section devoted to the installation of guidance elements. These guidance elements are referred to as control surfaces, being fins or vanes that react with the passing atmosphere in order to redirect the vehicle. Since it is common to redirect such a vehicle as to pitch and yaw, there are pitch control vanes 10 and there are yaw control vanes 11 disposed at right angles to each other on axes $a$ and $b$ that intersect. The matter of actuation about these two axes is made complex because of the requirement of compactness and because of the further characteristic of vane retraction which is required in this case. Although the vanes 10 and 11 normally project from the body of the vehicle, in this case they are retractable in which case they fold so as to lie within the diameter of the vehicle body and which requires articulated coupling of the actuators and a location of the actuators which will not interfere with retraction and/or extention of said control surfaces 10 and 11.

An object of this invention is to provide an actuator installation which independently revolves control vanes on right angularly related axes, within limited diametral confines, and which also permits articulated coupling of said actuators to the vanes operated thereby.

It is an object of this invention to provide an installation of the character referred to which is fluid pressure operated and wherein the right angularly related vanes are positively operated through double acting servo action.

It is still another object of this invention to provide an actuator installation of the character thus far referred to wherein a single member is advantageously employed to carry the actuators which in turn rotatably carry the vanes, to carry the fluid control for the actuators and to carry thrust means to receive the vanes and support them in an operative extended position.

The various objects and features of this invention will be fully understood from the following detailed description of the typical preferred form and application thereof, throughout which description reference is made to the accompanying drawings, in which:

FIG. 1 is a longitudinal sectional view taken through the body of a vehicle and showing the actual assembly of the present invention.

FIG. 2 is an enlarged section view taken as indicated by line 2—2 on FIG. 1.

FIGS. 3 and 4 are section views taken as indicated by line 3—3 and 4—4 on FIG. 2.

In the drawings a vehicle V is illustrated in general only, said vehicle having an elongated body 12 of cylindrical cross section and with a control section 13 from which the control vanes 10 and 11 project on right angularly related axes $a$ and $b$. The axes $a$ and $b$ intersect at the center longitudinal axis of the body 12 and said axes $a$ and $b$ are normal to the central body axis so as to be disposed diametrically of the body cross section. In the particular case illustrated, the body 12 has forwardly disposed recesses 14 therein to receive and to store the vanes 10 and 11 within the mold line (or contour) of the body, the rear most portion of said recesses 14 forming openings to freely pass the stems 15 of the vanes when in the extended operative position. Various means can be employed to extend the vanes 10 and 11 from the retracted positions within the mold line to the extended positions shown, including means operable through inherency functions relating to acceleration forces and/or centrifugal forces.

The body 12 of the vehicle V is a round body provided with an actuator compartment 20 that is confined to that portion of the body 12 which extends rearwardly from a diametrically disposed plane at the axis $a$ and $b$. The vanes 10 and 11 are provided in pairs that normally project from diametrically opposite sides of the body 12, with the stems 15 entering into the compartment 20 for coupled engagement with the actuators as hereinafter described and related. As shown, the vanes 10 and 11 revolve on the axes $a$ and $b$, at which axes the vanes are balanced as indicated. The stems 15 project equidistantly into the compartment 20 terminating intermediate the mold line of body 12 and the central axis thereof. In the case illustrated the inner terminal ends of the stems 15 are formed with flattened ears 21 aligned with the planes of the vanes 10 and 11 respectively, said ears being provided with pivot openings 22. Thus, the ears 21 are normally in longitudinally disposed planes, with the axes of openings 22 disposed transversely of the body 12.

With the foregoing construction it is possible for the vanes 10 and 11 to turn at the pivot openings 22 and to thereby fold into the confines of the body 12, said pivot openings 22 being placed sufficiently inward so as to permit complete retraction of the vanes. Each pair of vanes 10 and 11 is to be actuated together in unison from a common actuator and in accordance with this invention, this is accomplished through direct coupled engagement with an actuator shaft S rotatably carried by an actuator A. Further, and a feature of this invention, the two actuators A are preferably and advantageously identical in form and construction, being cooperatively interelated so as to independently actuate the vanes 10 and 11 by revolvement of the shafts S which are disposed on said intersecting axes $a$ and $b$. These features of construction are also accomplished while maintaining positive double acting servo motion, whereby lost motion is virtually eliminated thereby avoiding the possibility of flutter and other adverse phenomena which normally plague such devices.

The actuators A are alike and for all practical purposes can be considered identical, the only difference between the two actuators being the opposite projection of and the rotative position of the shaft S. However, the shafts S are alike and they too can be identical. Thus, the placement of the actuators A relative to each other determines the manner of assembly and the selection of shaft S installation. As seen from the drawings, the actuators A are right angularly related, each being spaced transversely from the central axis of the body 12, and displaced from said central axis along its own rotational axis $a$ or $b$ whichever case it may be. In carrying out the invention, the actuators A are positioned closely adjacent to the shaft S operated by the companion actuator, respectively, each actuator being positioned diametrically inward of the pivot openings 22 above referred to. As a result of said actuator placement, the bearing portions of the two actuators, to be hereinafter described, are spaced from each other, each being displaced from the center axis of the body 12 and also spaced from the adjoining actuator axis *a* or *b*.

In the drawings I have shown an actuator A which involves features which make for a very simple and practical device having predictable and positive functional characteristics. As shown, there is a double ended arcuate chamber 30 of segmental form, and a movable element operable along an arcuate axis, said movable element being rotatable on said axis *a* or *b*, above described. The actuator A involves a chambered frame F in which there is contained a movable part B, bearing means C to rotatably support the part B in the frame F, and glands D to operate against opposite sides of the part B in the chamber of frame F. The actuator is double acting and is capable of substantially quick and uniform operation without resort to cylinder chambers, the chambers 30 being of rectangular cross section. The stroke or rotational requirement in the particular case illustrated is limited, in which case substantially uniform operation is possible with the simplified construction shown wherein the cell-like gland D is simply an inflatable bladder.

The frame F can be fabricated in various ways and is shown, for example, as a chambered body with a face covered by a closure plate 32. The movable element or part B is in the nature of a partition operable to swing through the chamber 30. The chamber 30 is arcuately disposed along the arcuate axis and there is a lateral extension 33 of the chamber from which the movable part B swings. A composite of the chamber 30 and its extension 33 establishes a triangular segmental opening in the frame F and which is readily closed by the plate 32 which is flat.

The movable part B involves, essentially, a lever which revolves on the axis *a* or *b* and which acts as a movable partition. In order to provide a chamber in the nature of a cylinder and in order to avoid the relatively useless portion of the lever that extends through the chamber extension, an arcuate guide element 34 separates the chamber extension 33 from the said chamber 30 per se. The guide element 34 establishes the inner arcuate wall of the chamber, formed concentrically with the outer arcuate wall. Although the guide element 34 can be fixedly positioned and slotted to pass the movable part B, it is preferred that the element 34 be carried by the lever-like part B to move therewith. Therefore, the frame F is provided with opposite arcuate recesses 35 that receive and accommodate the opposite movable ends of the element 34. Thus, the effective cross sectional area of the chamber is fixed for accommodation of the glands D later described.

The bearing means C is provided so as to rotatably carry a shaft S on the axis *a* or *b*, and which involves a pivotal support for the movable part B. Said pivotal support comprises spaced bearings 36 and 37, one in the body of the frame F, and the other in the closure plate 32. The movable part B projects radially from the shaft S and is a flat plate-like element freely movable through the chamber 30 between limited positions as determined by the circumferential extent of the chamber extention 33 which has opposite opposed stop faces 38 and 39.

The glands D which characterize the actuator are provided to displace the movable part between opposite ends of the chamber and also to permit free movement of the part B in its function as a piston. Each gland D is a deformable bag-shaped part adapted to receive the application of fluid under pressure and thereby apply a moving force against the movable part B which is engaged by the gland D. The gland D is a cell-like bladder made of pliant and/or elastic material there being a pair of glands D each captured at an opposite end of and within the closed chamber 30. Each gland has a plug-like stem extending therefrom and into a ported opening in the frame F, the gland being formed with well rounded walls that fair into the other.

The shafts S are identical as shown and each is formed and disposed simmetrically relative to the central axis of the vehicle body 12. The opposite end portions 24 of the shafts are bifurcated to receive the ears 21, there being a pivot pin 23 passed through each end portions 24 and through each respective openings 22 in order to pivotally couple the vanes 10 and 11 to the ends of the shafts S. In accordance with the invention and in order for the two shafts S to pass each other at the intersection of their respective axes *a* and *b*, the center portion of each shaped S has a saddle 25, one offset to one side and vice versa. The offset of the saddle 25 is sufficient to permit the limited movement involved, the required turning movement of each shaft being about 20° in the case illustrated.

Although the shaft S is characterized by its symmetry the two shafts are rotatably supported at oppositely offset portions relative to the frames F, each being supported at a portion laterally offset from the central axis of the body 12 and adjacent to one side of the other shaft S. And, to this end each shaft S is pierced with a key-shaped opening 41 to receive a tongue 40 projecting from the movable part B. The tongues 40 of the two actuators A are selectively engaged in the openings 41, as shown, whereby each movable member normally bisects the chamber 30 in which it operates. It is from this normal bisecting position that the movable part B is displaced upon inflation of either gland D.

In accordance with the invention the movable parts B key the shafts S in position while the frames F of the two actuators A carry their respective shafts S on said right angularly related axis *a* and *b*. Therefore, it is necessary that the actuator frames F be mounted in the body 12 of the vehicle V, and to this end a single mount 50 is provided. The mount 50 is essentially a bulkhead to which the frames F are secured as by means of screw fasteners, said bulkhead being disposed in a plane transverse of the body 12. In the preferred form of the invention the frames F have flat faces engaged on the mount 50 at the side facing the compartment 20, there being suitable apertures 51 in the mount 50 and opening therethrough to the other side thereof where valves 52 are secured to the mount 50 in communication with said apertures 51 to supply and to exhaust fluid. It will be apparent how the frames F are ported as indicated in order to deliver fluid under pressure to and from the glands D as controlled by the valves 52.

Further, and in accordance with the invention, the mount 50 is a single element that carries all parts associated with the actuator assembly. To this end the mount 50 not only supports the two frames F but also carries seats 55 for receiving and positioning the stem 15 of the vanes 10 and 11. The stems 15 are shafts of round cross section and the seats are semi-circular bearings that open forwardly to receive the stems. As shown, the seats 55 are mounted on the mount 50 within the mold line of the body 12, there being four seats equally spaced circumferentially of the body 12 and each on a diametrical axis.

From the foregoing it will be seen that the arrangement of the actuators A is compact and reduced to a minimum number of parts. The actuator parts are or can be identical in each instance and it is simply a matter of selective assembly which determines the applicability of the actuator A to axis *a* or *b*. For example, the horizontally disposed actuator A on axis *a* can be referred to as right-handed and wherein the shaft S extends to the right and its saddle 25 offset forwardly; while the vertically disposed actuator A on axis *b* can be referred to as left-handed and wherein the shaft S extends to the left (or upwardly) and its saddle 25 offset rearwardly. In each instance the actuator A is secured directly onto the bulkhead mount 50 so that the bearings 36 and 37 are fixedly positioned on the intersecting axis a and b. Further, the transverse positioning of each shaft S is maintained by the keyed together relationship of the movable parts B that have tongues 40 inserted into the openings 41.

As a result of the assembly of parts formed and related as above described the movable part B is instantly displaced from the neutral position shown and by its direct coupled engagement with the vane 10 or 11 causes the immediate movement thereof. It will be apparent that there are no intervening transmission elements, whereby inertia is reduced to a minimum and looseness or play is virtually eliminated. Thus, it is significant that the mechanism involved is simple, direct and comprises but few light-weight parts, to the end that reliability is inherent and reaction time is minimized.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. An actuator assembly including in combination, an angularly related and crossed pair of double ended shafts to be independently revolved, an actuated element coupled to each opposite end of each shaft, an offset saddle at the center of at least one shaft whereby said shaft clears the other said shaft for independent revolvement, and an actuator for revolving each shaft and each actuator comprising a frame with a chamber therein and with bearings rotatably supporting one of said shafts at and inward of the coupling at one end thereof and with the opposite ends of said shaft extending free from the bearings, said chamber of the frame being disposed radially of the shaft carried in said bearings and disposed adjacent to the other angularly related shaft, and there being means operable within said chamber to revolve the shaft.

2. An actuator assembly including in combination, an angularly related and crossed pair of double ended shafts to be independently revolved, an actuated element coupled to each opposite end of each shaft, an offset saddle at the center of at least one shaft whereby said shaft clears the other said shaft for independent revolvement, and an actuator for revolving each shaft and each actuator comprising a frame with an arcuate chamber therein and with spaced bearings at each side of and concentric with said arcuate chamber and rotatably supporting one of said shafts at and inward of the coupling at one end thereof and with the opposite ends of said shaft extending free from the spaced bearings, said chamber of the frame being disposed radially of the shaft carried in said bearings and disposed adjacent to the other angularly related shaft, there being means comprising a movable part rotatably keyed to the shaft and engaged between the bearings of the frame to axially position the shaft and operable within the said chamber to revolve the shaft.

3. An actuator assembly including in combination, a pair of identical right angularly related and intersecting double ended shafts to be independently revolved, an actuated element coupled to each opposite end of each shaft, an offset saddle at the center of at least one shaft whereby said shaft clears the other said shaft for independent revolvement, and a pair of identical actuators and one coupled to each shaft and each actuator comprising a frame with a chamber therein and with bearings rotatably supporting one of said shafts at and inward of the coupling at one end thereof and with the opposite ends of said shaft extending free from the bearings, said chamber of the frame being disposed radially of the shaft carried in said bearings and disposed adjacent to the other right angularly related shaft, and there being means operable within said chamber to revolve the shaft.

4. An actuator assembly including in combination, a pair of identical right angularly related and intersecting double ended shafts to be independently revolved, an actuated element coupled to each opposite end of each shaft, an offset saddle at the center of at least one shaft whereby said shaft clears the other said shaft for independent revolvement, and a pair of identical actuators and each coupled to a shaft and each comprising a frame with an arcuate chamber therein and with spaced bearings at each side of and concentric with said arcuate chamber and rotatably supporting one of said shafts at and inward of the coupling at one end thereof, and with the opposite ends of said shaft extending free from the spaced bearings, said chamber of the frame being disposed radially of the shaft carried in said bearings and disposed adjacent to the other right angularly related shaft, there being means comprising a movable part rotatably keyed to the shaft and engaged between the bearings of the frame to axially position the shaft and operable within said chamber to revolve the shaft.

5. A pitch and yaw actuator assembly for installation on a transverse bulkhead member within a cylindrical vehicle body and comprising in combination, a pair of identical right angularly related and intersecting shafts to be independently revolved in diametrically disposed axes, an actuated element coupled to each opposite end of each shaft, an offset saddle at the center of at least one shaft whereby said shaft clears the other said shaft for independent revolvement, and a pair of identical actuators and one coupled to each shaft and each actuator comprising a frame with a chamber therein and with bearings rotatably supporting one of said shafts at and inward of the coupling at one end thereof and with the opposite ends of said shaft extending free from the bearings, said chamber of the frame being disposed radially of the shaft carried in said bearings and disposed adjacent to the other right angularly related shaft, and there being means operable within said chamber to revolve the shaft.

6. A pitch and yaw actuator assembly for installation on a transverse bulkhead member within a cylindrical vehicle body and comprising in combination, a pair of identical right angularly related and intersecting shafts to be independently revolved on diametrically disposed axes, an actuated element coupled to each opposite end of each shaft, oppositely offset sadles at the center of each shaft whereby each shaft clears the other for independent revolvement, and a pair of identical actuators and each coupled to a shaft and each actuator comprising a frame with an arcuate chamber therein and spaced with bearings at each side of and concentric with said arcuate chamber and rotatably supporting one of said shafts at and inward of the coupling at one end thereof and with the opposite ends of said shaft extending free from the spaced bearings, said chamber of the frame being disposed radially of the shaft carried in said bearings and disposed adjacent to the other angularly related shaft, there being means comprising a movable part rotatably keyed to the shaft and engaged between the bearings of the frame to axially position the shaft and operable within said chamber to revolve the shaft.

References Cited

UNITED STATES PATENTS

| | | | |
|---|---|---|---|
| 1,580,249 | 4/1926 | Hornor | 92—138 X |
| 1,677,112 | 7/1928 | Anderson | 92—138 X |
| 2,414,898 | 1/1947 | Rous | 102—50 |
| 2,649,077 | 8/1953 | Mehm | 92—120 |
| 3,051,143 | 8/1962 | Nee | 92—92 |
| 3,132,590 | 5/1964 | Hall | 102—50 |
| 3,137,214 | 6/1964 | Feld et al. | 92—90 X |
| 3,146,681 | 9/1964 | Sheesley | 92—138 X |
| 3,229,590 | 1/1966 | Huska | 92—92 X |

MARTIN P. SCHWADRON, *Primary Examiner.*

EDGAR W. GEOGHEGAN, *Examiner.*

I. C. COHEN, *Assistant Examiner.*